No. 852,866. PATENTED MAY 7, 1907.
A. W. BODELL.
DISH WASHING MACHINE.
APPLICATION FILED JUNE 20, 1906.
3 SHEETS—SHEET 2.
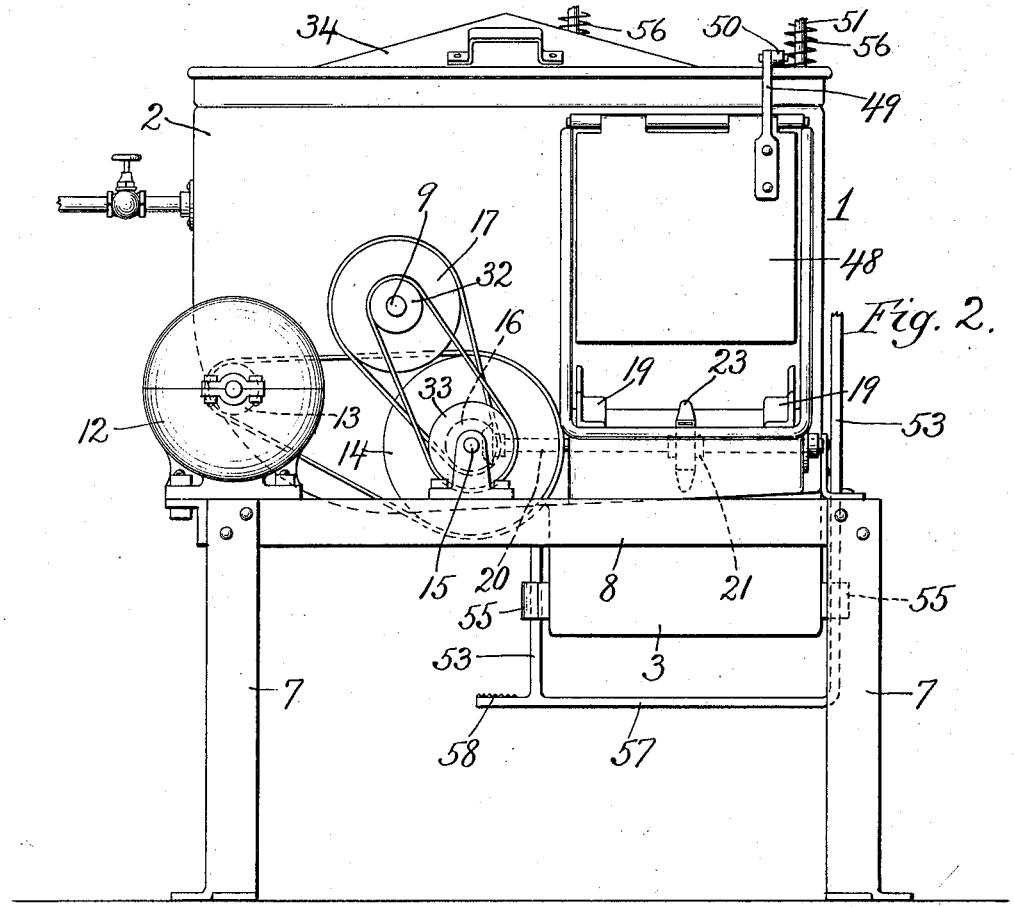
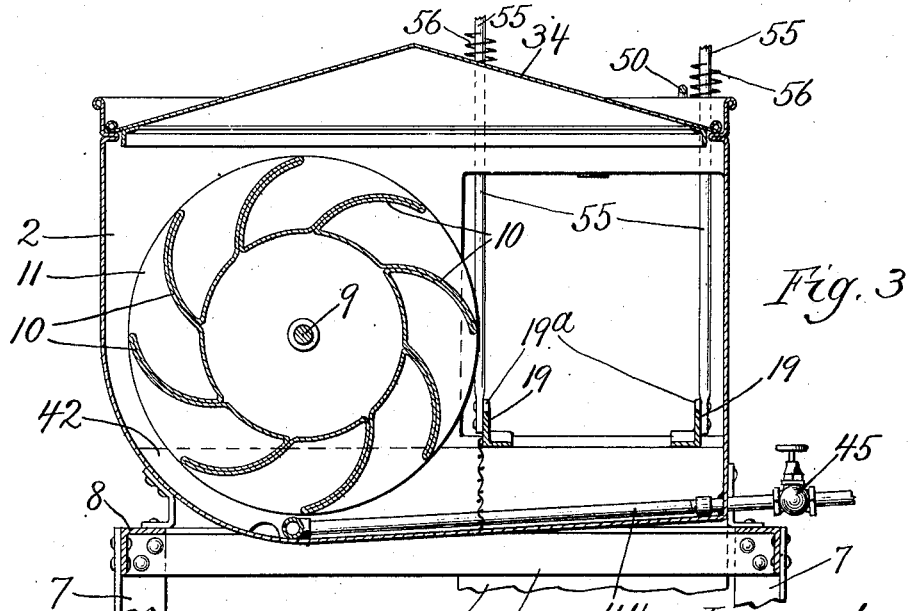
Witnesses,
Edward T. Wray.
J. S. Abbott
Inventor.
Allen W. Bodell
by Burton Burton his Attys.

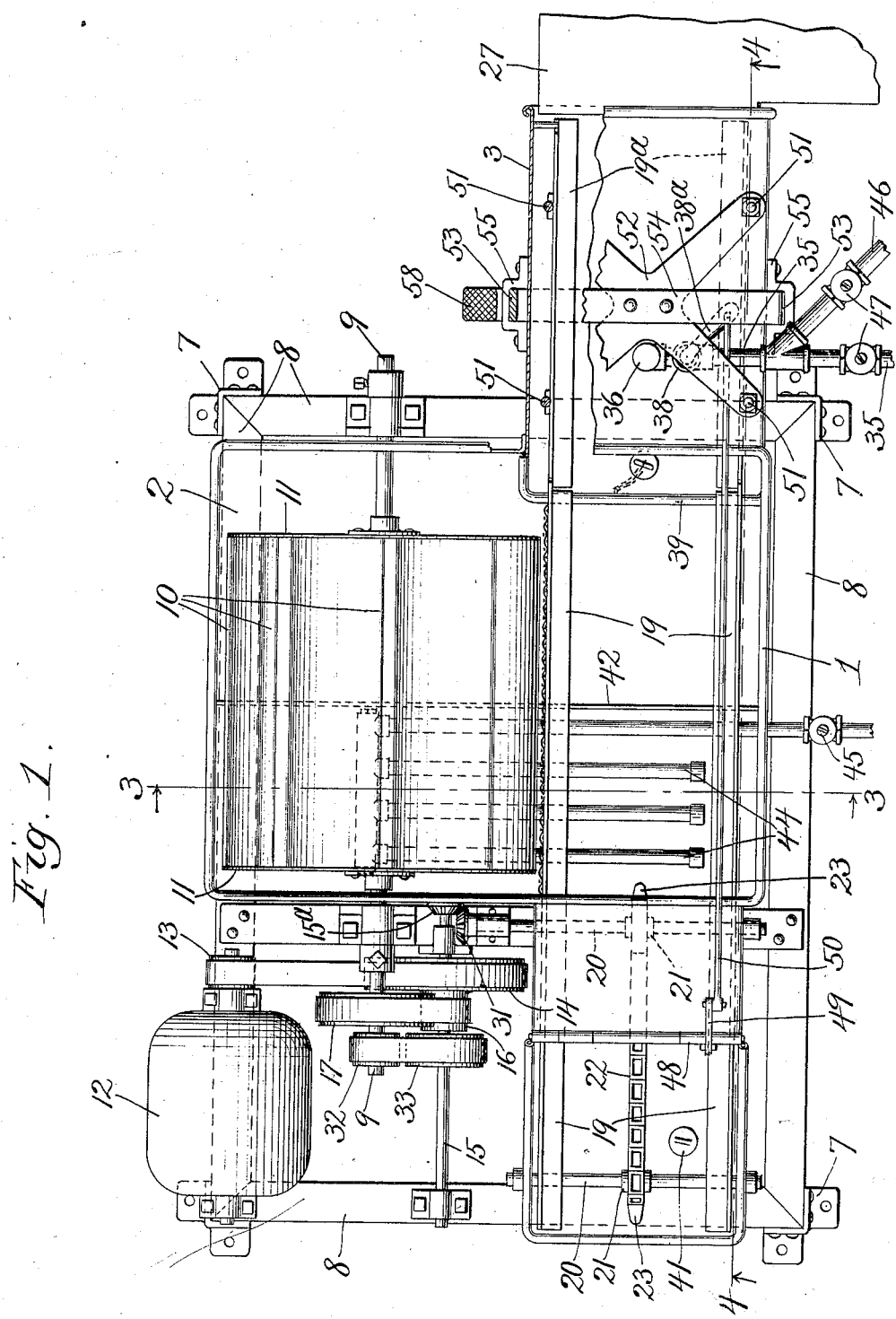

No. 852,866. PATENTED MAY 7, 1907.
A. W. BODELL.
DISH WASHING MACHINE.
APPLICATION FILED JUNE 20, 1906.
3 SHEETS—SHEET 3.
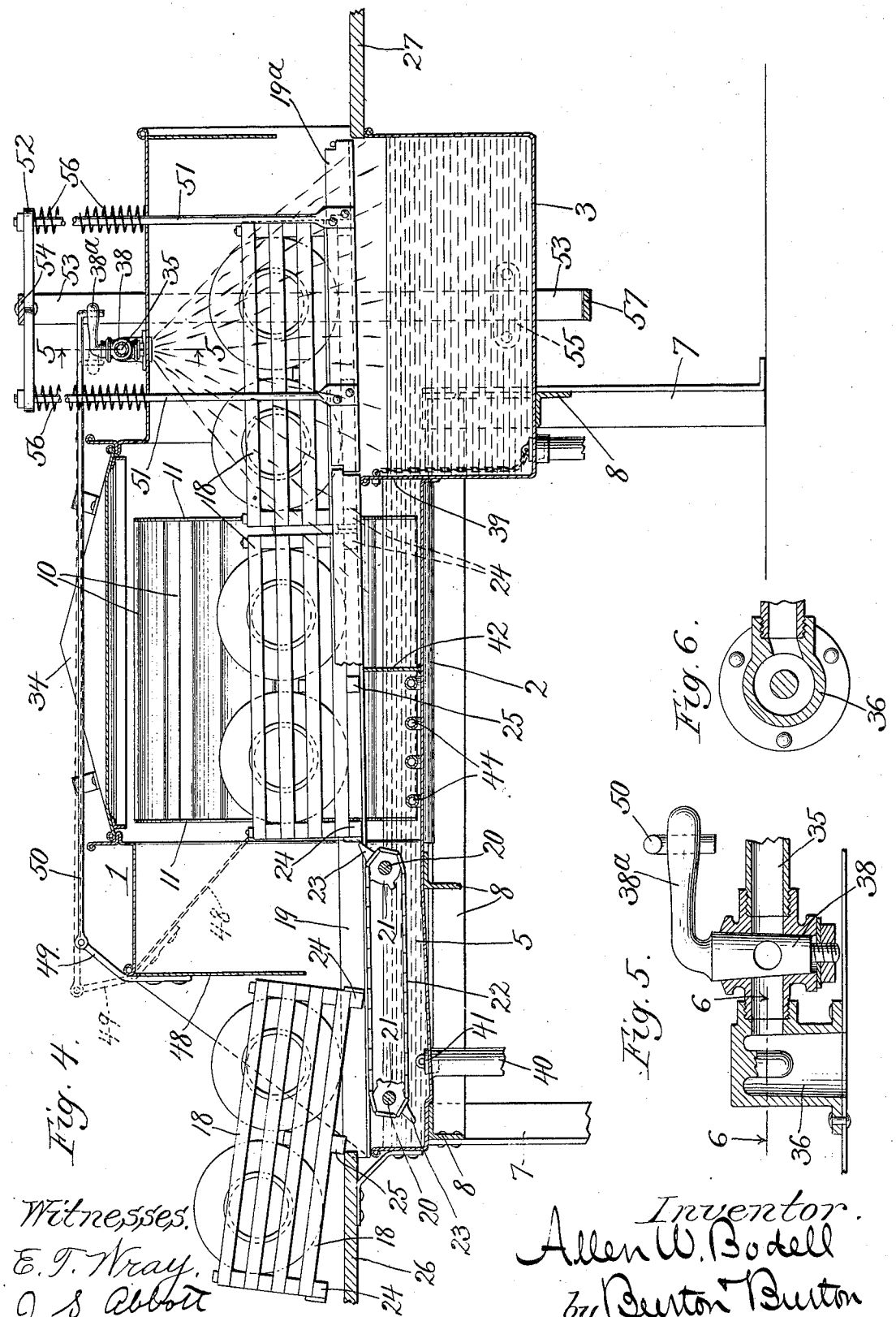
Witnesses.
E. T. Wray.
J. S. Abbott
Inventor.
Allen W. Bodell
by Burton & Burton
his Attys.

UNITED STATES PATENT OFFICE.

ALLEN W. BODELL, OF WILMETTE, ILLINOIS.

DISH-WASHING MACHINE.

No. 852,866.　　　　　Specification of Letters Patent.　　　　Patented May 7, 1907.

Application filed June 20, 1906. Serial No. 322,499.

*To all whom it may concern:*

Be it known that I, ALLEN W. BODELL, a citizen of the United States, residing at Wilmette, in the county of Cook and State of Illinois, have invented new and useful Improvements in Dish-Washing Machines, of which the following is a specification, reference being had to the accompanying drawings, forming a part thereof.

The purpose of this invention is to provide improved means for cleansing dishes with minimum handling.

In the drawings:—Figure 1 is a plan of the entire device. Fig. 2 is an end elevation of the same. Fig. 3 is a section at the line 3—3 on Fig. 1. Fig. 4 is a longitudinal section at the line 4—4 on Fig. 1. Fig. 5 is a detail section at the line 5—5 on Fig. 4. Fig. 6 is a detail section at the line 6—6 on Fig. 5.

In general the device shown in the drawings comprises a receptacle, 1, which is preferably made, as represented, of metal. This receptacle comprises a widened portion, 2, which does not extend through the entire length, and a deepened portion, 3, which extends only for a portion of the length. The widened portion extends along a middle portion of the length of the entire receptacle, and the deepened portion is at the exit end. The widened portion contains a water-dipping and showering wheel, and the deepened portion is designed for the submersion of the dishes for special purpose immediately before their delivery or exit from the receptacle. The dishes are carried through this receptacle on a longitudinal track, 19, which extends the entire length including a narrower portion, 5, at the entrance end, as well as the similarly narrowed and deepened portion, 3, at the exit end. The track is elevated above the bottom of the receptacle to a sufficient extent so that the water lifted by the revolving wheel hereinafter described is taken up in sufficient quantity to be thrown onto the dishes as they pass alongside such wheel, the dishes being thus carried in the air above the water, so that that which is thrown upon them from the wheel is drained off immediately, carrying with it the material from which the dishes are to be cleansed. A frame structure represented by supporting legs, 7, 7, and horizontal sills, 8, 8, carries the entire receptacle.

Through the widened portion, 2, a shaft, 9, extends longitudinally carrying the water lifting and showering wheel, which is of the nature of a paddle or bucket wheel made preferably with dishes vanes or paddles, 10, embraced between heads, 11, to form water-dipping pockets or buckets. The wheel is designed to be revolved with the concave paddles or vanes forward so that the water buckets dip the water from the lower part of the receptacle and throw it from the upper side of the wheel over into the portion of the receptacle occupied by the tracks and onto the dishes which are carried along those tracks, as hereinafter more particularly described. 12 represents a motor which may be, as its form is intended to indicate, an electric motor having its pulley, 13, belted to the pulley, 14, on a countershaft, 15, which is journaled in bearings mounted on the supporting frame. Rigid with the pulley, 14, is a small pulley, 16, which is belted to a larger pulley, 17, fast on the shaft, 9, and by these connections the relatively high speed of the motor shaft is reduced to the relatively low speed of the shaft, 9, which carries the water dipping and showering wheel.

For the purpose of carrying the dishes past the showering wheel to receive the water therefrom, they are designed to be placed in baskets or racks, 18, which are of proper dimensions to be supported and moved longitudinally on a track which consists of angle-iron rails, 4, 4, extending longitudinally from end to end of the receptacle or tank, both in the narrow entrance portion past the widened portion, 2, and above the deepened portion, 3. The portions, 19$^a$, of the track rails over the deepened portion, 3, of the receptacle are severed from the remainder for the purpose hereinafter explained. These rails are located at a distance above the bottom of the receptacle corresponding to the depth of water ordinarily designed to be maintained therein, so that the dishes, as stated, are carried above the water and receive the showered water in position permitting it to be drained off.

For advancing the dish-containing baskets along the track there are journaled in the narrow portion of the receptacle at the receiving end where that portion projects beyond the widened portion, 2, two transverse shafts, 20, 20, having sprocket wheels, 21, 21, about which a chain, 22, is driven. The location of the shafts and the diameter of the sprocket wheels is such that the upper ply of the chain as it passes about said wheels is just below the level of the basket-supporting flange of the track rails, 19. The chain has one or two,—preferably, as shown, two,—propelling teeth, 23, 23; that is, two links of the chain are provided each with one such tooth projecting upward from the upper ply for engaging with the baskets to propel them along the track. The baskets are preferably constructed with end cross bars, 24, 24, at the bottom, and also with the middle cross bar, 25; and the fingers, 23, engage these cross bars for propelling the baskets along the track. At the receiving end of the receptacle there is mounted a table, 26, whose surface is a little higher than the level of the track, and the baskets being lodged on this table for filling are pushed off therefrom onto the track, on which their forward end lodges with a downward inclination, so that the forward cross bar, 24, is in position to be engaged by the first of the teeth or fingers, 23, which reaches it from the rear. The basket thus drawn off the table and lodged on the track is carried forward by the engagement of this first finger until the second finger engages the rear bar, 24, and by said second engagement the basket is pushed on along the track to a position opposite the paddle wheel. Meanwhile a second basket will be similarly engaged by the fingers of the chain, and being pushed against the first basket will advance the latter along the track past the wheel and onto the portion, 19ª, of the track rails overhanging the deepened portion, 3, of the receptacle; and eventually the baskets will push off from the track rails and pass out from the receptacle onto a receiving table, 27, mounted at the exit end, from which they will be successively removed by an attendant to make room for the baskets which follow.

For driving the propelling chain, 22, one of the shafts, 20, extends out through the side wall of the receptacle, and at the end is provided with a bevel-gear, 31, meshing with a bevel-gear, 15ª, on the shaft, 15, which derives rotary motion from the shaft, 9, by means of a pulley, 32, on that shaft belted to a pulley, 33, on the shaft, 15, the relative dimensions of the pulleys, 32 and 33, being such as to reduce the speed of the shaft, 15, below that of the shaft, 9, to give proper slow movement of travel of the baskets past the showering wheel.

At the entering narrow portion of the receptacle it is not necessarily deeper than required to accommodate the proper depth of water and the basket-propelling device therein, but the remainder of the receptacle containing the paddle wheels and the entire portion in which the dishes are exposed to the water shower, is made to completely inclose the paddle wheel and dishes, and is provided with a removable cap or cover, 34.

Water is supplied to the apparatus through a pipe, 35, back of whose discharge nozzle a plug valve or turn-cock, 38, is located to control the discharge. The discharge nozzle is preferably of construction for spraying the water, and it overhangs the deepened portion, 3, and discharges the water in a spray upon the dishes as they reach the portion, 19ª, of the track. By this arrangement, fresh, clean water, at the highest temperature which may be found desirable to employ, is delivered onto the dishes which have been thoroughly washed and rinsed, and which thus receive a final rinsing with water so hot that they dry almost instantly as the water drains from them. This portion of the tank is preferably partitioned off from the remainder by the partition, 39, extending up to the under side of the track, so that the water overflows from this deepened portion back into the remainder of the receptacle for supplying the showering wheel. A nearly constant supply of water is maintained past the valve, 38, (interrupted at intervals, as hereinafter explained) and a constant discharge of water may be allowed from the entering end of the first compartment where a discharge pipe, 40, is provided with a stopper, 41. The water first overflowing from the compartment, 3, is practically clean and is hot enough for rinsing the dishes. The continuous movement of water from the exit toward the entering end (using those terms with reference to the progress of the dishes) causes the material which is scoured from the dishes when they first advance to a point opposite the showering wheel to be floated and carried with the current back toward the entering end for discharge through the pipe, 40, so that without any other separation between the different parts of the water it remains, as stated, suitably clean for rinsing when it first passes over from the compartment, 3, to a point opposite the wheel to be dipped thereby and showered onto the dishes which have been cleansed by their movement past the wheel up to that point. It may be found desirable, however, to assist this same purpose of preventing the impurities washed off from the dishes from moving back and being found in the water showered onto the dishes at the later stage which should be the rinsing stage to provide a partition, 42, about midway in the length of the wheel opposite the same, of course not extending into the widened portion of the receptacle occupied by the wheel itself, but only under the track, as illustrated. The water will then not only overflow this partition in moving back toward the discharge, but will also pass around it through the wheel.

If it should be found in any instance that the water is too much cooled by the time it reaches the point for showering onto the soiled dishes at their first entrance, as may happen when the surface of the dishes exposed is very large, provision for re-heating the water or maintaining it at proper temperature may be located in the first compartment,—that is, the portion of the receptacle under the track opposite the half of the wheel next the entering end,—such provision consisting of a system of steam pipes, 44, laid in the bottom of the compartment under the track and controlled by an inlet valve, 45.

For the purpose of the sanitary treatment of the dishes, I prefer to supply the water in a suitable sterilizing condition, and the pipe, 35, through which the water is delivered is provided with an inlet branch, 46, back of the valve, 38, through which a suitable sterilizing fluid is delivered into the pipe and commingled with the water at its discharge through the spray nozzle, 36. Each of the pipes, 35 and 46, is provided with a proper cut-off valve, 47, back of the junction of the two pipes.

In order that the water may not be wastefully used, but may be furnished only through the actual passage of the dishes through the machine, and may be cut off without the actual attention of the operator (who might be inattentive to this point) I prefer to connect the handle, 38ª, of the valve, 38, with means for causing it to be operated automatically by the baskets as they enter the machine; and for this purpose a trip gate, 48, is hung at the entering end of the receptacle, depending above the track about midway in the length of the propeller. A lever arm, 49, extending up from the hinge of the trip gate is connected by a link, 50, with the handle, 38ª, of the valve. The weight of the gate is sufficient to close the valve in falling back to vertical position from the position to which the basket lifts it in passing under it, so that whenever the succession of baskets is interrupted the valve will be closed, but as long as the baskets follow each other continuously the water will be supplied.

For the purpose of insuring the thorough rinsing of the dishes before they are delivered out of the receptacle the latter is deepened as described at the part, 3, and the portion, 19ª, of the track rails at this point is severed from the remainder and the rails are suspended by rods, 51, 51, which extend out through the top of the receptacle and are connected by an X-shaped tie bar, 52, which is in turn attached to vertical guide bars, 53, 53, connected by a cross bar, 54, for attachment to a tie bar, 52, as stated. These guide bars run in suitable guide clips, 55, attached to the outside of the receptacle. Springs, 56, coiled around the suspending rods, 51, and reacting against the tie bar, 52, and the top of the tank uphold the track rails, 19ª, and the basket which may be lodged thereupon at any time; but for submersion of such basket and its contents the operator will depress the portion of the track carried by the suspending rod, 51, into the deepened portion, 3, of the receptacle. For such purpose the guide bars, 53, are connected by a cross bar, 57, under the receptacle, and to this cross bar an operating pedal, 58, is connected.

I claim:—

1. A dish-washer comprising an aerial carrier for the dishes; means for moving such carrier; a water lifting and showering wheel located alongside the path of the carrier; a receptacle in which the wheel and the carrier operate, the receptacle and path of the carrier being extended beyond the showering wheel; means for supplying water thereto at or near the exit end of the carrier's path; and means for draining the water from the receptacle near the entering end of said path.

2. A dish-washer comprising an aerial carrier for the dishes; means for moving such carrier; a water lifting and showering wheel located alongside the path of the carrier; a receptacle in which the wheel and the carrier operate, which is extended beyond the showering wheel; means for supplying water to the receptacle by showering the same upon the contents of the carrier at the extended portion beyond the wheel, and means for draining the water from the receptacle near the entering end of the carrier's path.

3. A dish-washer comprising a carrier for the dishes; means for moving such carrier; a water lifting and showering wheel located alongside the path of the carrier; a receptacle in which the wheel and carrier operate extended beyond the showering wheel; means for supplying water to the receptacle from above the carrier by discharging such water on to the contents of the carrier at the extended portion beyond the showering wheel; a trip device near the entering end of the receptacle in position to be operated by the entrance of the carrier; a valve which controls the water supply, and a connection from said trip device to the said valve for opening the valve when the carrier enters past the trip device adapted to close it when the trip device is free from the action of the carrier.

4. A dish-washer comprising a receptacle; a track extended therethrough; a carrier for the dishes adapted to be moved over such track; a water lifting and showering wheel in the receptacle at one side of the track, and means for rotating the wheel to cause it to throw the water over onto the contents of the carrier on the track; a carrier-propelling device located in the entering end portion of the receptacle preceding the part alongside which the showering wheel is located, and means for operating such propeller.

5. A dish-washer comprising an aerial carrier for the dishes; means for moving such carrier; a water lifting and showering wheel located alongside the path of the carrier; a receptacle in which the wheel and the carrier operate, said receptacle having at the exit end a deepened portion, and means for raising and lowering the carrier to submerge the contents thereof at such deepened portion.

6. A dish-washer comprising an aerial carrier for the dishes consisting of a track and trays or baskets movable therealong; a propelling device operating in the track to propel the trays or baskets therealong, the receptacle having at the exit end a deepened portion, the portion of the track at that end being detached from the remainder, and means for raising and lowering it in said deepened portion to submerge the trays or baskets thereon.

7. A dish-washer comprising a receptacle; a track extending longitudinally therein adapted to support dish-carriers movable therealong; a propelling device operating in the track to so propel the trays or baskets, the receptacle having at the exit end a deepened portion, the track overhanging that portion being detached from the remainder; spring-supported rods by which it is suspended adapted to uphold both the track and the trays or baskets which may be lodged thereon, and means for depressing said suspended portion of the track at will against the tension of the spring supports.

8. A dish-washer comprising a receptacle; a track extending longitudinally therein adapted to support dish-carriers movable therealong, the receptacle having at the exit end a deepened portion, the track rails overhanging that portion being detached from the remainder; a frame by which said detached portions of the rails are suspended; springs which uphold the suspended portion in position registering with the remainder of the rails and foot-operated connections from said frame for depressing it at will to submerge the contents of the dish-carriers on the detached portion of the track.

9. A dish-washer comprising an aerial carrier for the dishes; a receptacle through which such carrier may be moved longitudinally; means for so moving the carrier; a water lifting and showering wheel located in the receptacle at one side of the path of the carrier; means for supplying water to the receptacle consisting of a sprinkler for discharging same onto the contents of the carrier over a portion of the receptacle at the exit end beyond the showering wheel, and means for supplying such sprinkler with sterilizing fluid.

In testimony whereof, I have hereunto set my hand at Chicago, Illinois, this 15th day of June, A. D., 1906.

ALLEN W. BODELL.

Witnesses:
J. S. ABBOTT,
M. GERTRUDE ADY.